United States Patent [19]
Goodman et al.

[11] Patent Number: 4,623,398
[45] Date of Patent: Nov. 18, 1986

[54] ORGANO-CLAYS

[75] Inventors: Howard Goodman; Andrew R. Fugler, both of St. Austell, England

[73] Assignee: English Clays Lovering Pochin & Company, Ltd., Cornwall, England

[21] Appl. No.: 727,022

[22] Filed: Apr. 25, 1985

[30] Foreign Application Priority Data

Apr. 27, 1984 [GB] United Kingdom ................. 8410881
Nov. 2, 1984 [GB] United Kingdom ................. 8427821

[51] Int. Cl.$^4$ ........................ C04B 14/00; C04B 33/00
[52] U.S. Cl. ............................... 106/308 N; 501/145; 501/148; 501/149; 106/309
[58] Field of Search ..................... 501/148, 145–147, 501/149, 106; 106/308 N, 287.25, 309

[56] References Cited

U.S. PATENT DOCUMENTS

| 4,208,218 | 6/1980 | Finlayson | 106/287.25 |
| 4,371,626 | 2/1983 | Hentz | 501/145 |
| 4,391,637 | 7/1983 | Mardis | 106/20 |
| 4,483,934 | 11/1984 | Goodman et al. | 501/147 |

Primary Examiner—Theodore Morris
Attorney, Agent, or Firm—Stefan J. Klauber

[57] ABSTRACT

An organo-clay is prepared by mixing a quaternary ammonium compound with an aqueous suspension of a smectite clay; thereafter subjecting the smectite clay/quaternary ammonium compound/water mixture to high shear mixing for a time sufficient to dissipate in the mixture at least 100 KJ of energy per kg. of dry solids in the mixture; and then dewatering the product thus obtained.

8 Claims, No Drawings

ORGANO-CLAYS

BACKGROUND OF THE INVENTION

This invention relates to a process for preparing organo-clays and to the products of such a process.

An organo-clay is an organophilic cation-modified clay derived from a clay mineral, generally of the smectite group, for example bentonite, montmorillonite, hectorite, saponite or the like, by replacing the inorganic exchangeable cations, generally alkali or alkaline earth metal cations, which occur in the natural clay mineral by organic cations each comprising at least one hydrocarbon radical which has sufficient carbon atoms to render the surface of the cation-exchanged clay hydrophobic.

Organo-clays have been found to be very useful as thixotropic agents in organic media such as, for example, lubricating greases, oil-based drilling fluids, paints, varnishes, enamels and printing inks. However, an organo-clay is, in general, difficult to disperse in an organic medium to form the uniform gel structure which is required to thicken, or to increase the viscosity of, the organic medium. Various means have been used to improve the dispersibility of an organo-clay in an organic medium including the use of a polar organic material, such as a low molecular weight alcohol or ketone, as a dispersing aid, and the use of an excess of a specially selected organic cation in the preparation of the organo-clay.

It is an object of this invention to prepare an organo-clay which will disperse readily under low shear in an organic medium to form a homogeneous gel structure without the use of an additional polar organic material.

SUMMARY OF THE INVENTION

According to the present invention there is provided a process for preparing an organo-clay which is readily dispersible in an organic medium, which process comprises (a) mixing an aqueous suspension of a clay of the smectite group with a quaternary ammonium compound capable of rendering the smectite group clay organophilic;

(b) subjecting the mixture formed in step (a) to mixing at high shear for a time sufficient to dissipate in the mixture at least 100 KJ of energy per kg. of dry solids in the mixture; and (c) dewatering the product of step (b). Preferably, the dewatered product of step (c) is dried and milled.

In step (a) the quaternary ammonium compound is preferably one which can be represented by the general formulae:

$$\left[ \begin{array}{c} R_1 \\ | \\ R_4-N^+-R_2 \\ | \\ R_3 \end{array} \right] X^-$$

wherein $R_1$ is a saturated or unsaturated alkyl group having from 10 to 24 carbon atoms, $R_2$ and $R_3$, which may be the same or different, are each a saturated or unsaturated alkyl group having from 1 to 24 carbon atoms or an aralkyl group having from 7 to 10 carbon atoms, $R_4$ is an alkyl group having from 1 to 6 carbon atoms or an aralkyl group having from 7 to 10 carbon atoms, and X is OH, Cl, Br, I, $NO_2$, $CH_3SO_4$ or $CH_3.COO$. Examples of such compounds are the benzyl methyl dialkyl ammonium chlorides, the dimethyl dialkyl ammonium chlorides, the benzyl dimethyl alkyl ammonium chlorides, the benzyl trialkyl ammonium chlorides and the methyl trialkyl ammonium chlorides, where the one or more alkyl group is a mixture of hydrocarbon radicals derived from tallow and having from 14 to 20 carbon atoms but in which $C_{18}$ radicals preferably predominate (A typical analysis of such a mixture of hydrocarbon radicals contained in tallow is: $C_{14}$ 2.0%; $C_{15}$ 0.5%; $C_{16}$ 19.0%; $C_{17}$ 1.5%; $C_{18}$ 66.0% and $C_{20}$ 1.0%). The hydrocarbon radicals may be partially unsaturated, as in natural tallow, or may be substantially completely saturated as a result of treating the tallow with hydrogen in the presence of a suitable catalyst.

Usually, it has been found advantageous to melt the quaternary ammonium compound before it is mixed with the aqueous suspension of the smectite group clay. It is also preferred to mix the molten quaternary ammonium compound with water at a temperature higher than the melting point of the quaternary ammonium compound before it is mixed with the aqueous suspension of the smectite group clay. If this latter procedure is followed, the mixture formed from the quaternary ammonium compound and the hot water is preferably subjected to mixing at high shear for a time sufficient to dissipate in the mixture at least 100 KJ of energy per kg. of dry quaternary ammonium compound.

The mixing at high shear is preferably effected by passing the suspension through a homogeniser of the type in which the suspension is forced in the form of a thin film edgewise through a thin, hard-surfaced gap under a pressure of at least 250 pounds per square inch (1.7 MPa) and at high velocity. A suitable homogeniser is described in British Patent Specification No. 987,176 and in U.S. Pat. Nos. 3,039,703 and 3,162,379). Such a homogeniser is manufactured by the Manton-Gaulin Company. Advantageously the homogeniser is operated at a pressure of at least 1500 pounds per square inch (10.5 MPa). The amount of energy E, in KJ per kg. of dry solids, dissipated in the mixture is given by the expression

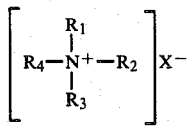

$$E = \frac{nP \cdot 10^3}{w}$$

where P is the pressure in MPa exerted in the Manton-Gaulin homogeniser, n is the number of passes through the Manton-Gaulin homogeniser, and w is the weight in grams of dry solids in one liter of the aqueous mixture.

The aqueous suspension of the smectite group clay is preferably, but not necessarily, added to the quaternary ammonium compound rather than vice versa. The suspension of the clay is preferably mixed with the quaternary ammonium compound in proportions such that there are present from 95 to 140 milliequivalents of quaternary ammonium cation per 100 g of dry clay. The optimum amount of quaternary ammonium compound per unit weight of dry clay depends upon the nature of the quaternary ammonium compound. For example, when the quaternary ammonium compound is methyl benzyl di-hydrogenated tallow ammonium chloride, the amount of the quaternary ammonium compound used is preferably in the range of from 100 to 115 milliequivalents per 100 g of dry clay, and when the quaternary ammonium compound is dimethyl di-hydrogenated tallow ammonium chloride the amount thereof used is preferably in the range of from 120 to 130 milliequivalents per 100 g of dry clay.

The invention is illustrated by the following Examples.

EXAMPLE 1

Orango-clays A, B and C were prepared in the following manner:

In each case there was prepared a dispersion of benzyl methyl di-hydrogenated tallow ammonium chloride by pouring 42 g. of the molten quaterany ammonium compound into a 1 liter of water at 65° C. The suspension thus formed was then subjected to mechanical work as outlined below:

| Organo-clay | Nature of mechanical work |
| --- | --- |
| A | 5 passes through a Manton Gaulin homogeniser at 6000 psi (6566 KJ.kg$^{-1}$) |
| B | Laboratory stirrer for 30 minutes |
| C | 5 passes through a Manton Gaulin homogeniser at 6000 psi (6566 KJ.Kg$^{-1}$) |

In each case a sample of raw Wyoming sodium bentonite was mixed in a blunger with sufficient water to form a suspension containing 10% by weight of dry clay and 1% by weight, based upon the weight of dry clay, of tetrasodium pyrophosphate as a dispersing agent. The deflocculated suspension thus formed was passed through a No. 300 mesh British Standard sieve (nominal aperture 0.053 mm) and the undersize fraction was diluted with water to about 6% by weight of solids, and subjected to a particle size separation in a nozzle discharge, disc centrifuge at a flow rate of 2 liters per minute. The fine fraction was then passed once through a Manton Gaulin homogeniser at a pressure of 6000 psi (41.4 MPa).

In each case 1 Kg. of the clay slurry prepared as described above was added, at a temperature of 65° C., to the dispersion of the quaternary ammonium compound at approximately the same temperature and the mixture thus formed was subjected to mechanical work as indicated below:

| Organo-clay | Nature of mechanical work |
| --- | --- |
| A | 2 passes through a Manton Gaulin homogeniser at 6000 psi (2068 kJ.Kg$^{-1}$) |
| B | 2 passes through a Manton Gaulin homogeniser at 6000 psi (2068 kJ.Kg$^{-1}$) |
| C | 2 minutes in a Silverson shrouded impeller mixer followed by 28 minutes in a laboratory stirrer. |

In each case the suspension of the organo-clay was then filtered on a Buchner funnel, washed with hot water and dried for 16 hours at 60° C. in an air-swept oven. The dry product was then milled to pass through a sieve of normal aperture 0.080 mm.

The organo-clays thus formed were then tested for ease of dispersion in an alkyd gloss paint formulation. Each organo-clay was stirred into the paint composition, which was complete apart from the organo-clay, using a Cowles blade of diameter 41 mm at 2500 rpm. During the stirring operation small samples were taken on a spatula and spread on a Hegman gauge. The dispersion time was considered to be the time taken for the sample on the Hegman gauge to be free of visible solid particles.

A larger sample of each completely mixed paint composition was allowed to stand for 24 hours and measurements of the viscosity of the compositions at 21° C. were then made using a Brookfield Viscometer at Spindle speeds of 50 rpm, 5 rpm and 1 rpm respectively.

As a comparison, a commercially-available, "super-dispersing" organo-clay, D, marketed by NL Industries Inc. under the trade name "SDI" was stirred into an identical alkyd gloss paint composition and subjected to the same tests.

In the case of the organo-clays A, B and C the clay was added to the dispersion of the quaternary ammonium compound in proportions such that there were present in the organo-clay 113 milliequivalents of the organic cation per 100 g. of dry clay.

In the case of organo-clay D there were present a total of 145 milliequivalents of organic ions (cations and anions) per 100 g. of dry clay.

The results obtained are set forth in Table 1 below:

TABLE 1

| Organo-clay | Dispersion time (minutes) | Viscosity after 24 hours (centipoise) | | |
| --- | --- | --- | --- | --- |
| | | 50 rpm | 5 rpm | 1 rpm |
| A (invention) | 7 | 1264 | 1960 | 3000 |
| B (invention) | 12 | 1104 | 1760 | 2080 |
| C (invention) | 20 | 1300 | 2400 | 4400 |
| D (comparative) | 20 | 1160 | 1864 | 2800 |

These results show that the ease of dispersion of the organo-clay into the paint composition is improved if the quaternary ammonium compound is subjected to high shear mixing in water prior to mixing with the clay suspension and if the organo-clay suspension is then also subjected to a high shear mixing. Superior results are obtained if the high shear mixing is performed in a homogeniser of the type described above.

Note

The alkyd gloss paint composition was prepared in the following manner. The ingredients set out below were first mixed together in the stated proportions by weight:

| Ingredient | Wt. % |
| --- | --- |
| Alkyd resin | 20.0 |
| White spirit | 8.25 |
| Calcium naphthenate | 0.9 |
| Titanium dioxide | 29.8 |
| Methylethyl ketoxime | 0.2 |

When the above components of the composition had been thoroughly mixed the following materials were added under stirring in the following order:

| Ingredient | Wt. % |
| --- | --- |
| Alkyd resin | 33.0 |
| White spirit | 6.25 |
| Lead naphthenate | 0.8 |
| Cobalt naphthenate | 0.3 |
| Organo-clay | 0.5 |
| Total | 100.0% |

The calcium, lead and cobalt naphthenate are drying agents and the methylethyl ketoxime is an anti-skin agent.

EXAMPLE 2

A further organo-clay, E, was prepared in a manner identical to that described for organo-clay B above except that the suspension of the quaternary ammonium compound was added at 65° C. to the hot clay suspension, instead of the clay suspension being added to the suspension of the quaternary ammonium compound. The organo-clay was subjected to the same tests as described under Example 1 and the results obtained are set forth in Table II below:

TABLE II

| Organo-clay | Dispersion time (minutes) | Viscosity after 24 hours | | |
|---|---|---|---|---|
| | | 50 rpm | 5 rpm | 1 rpm |
| B (invention) | 12 | 1104 | 1760 | 2080 |
| E (comparative) | 26 | 1236 | 2168 | 2840 |

EXAMPLE 3

Four further organo-clays, F, G, H and I, all in accordance with the invention, were prepared according to the method described for organo-clays, A, B and C in Example I, except that in each case high shear mixing was performed in the Manton Gaulin homogeniser and the conditions under which the mixing was performed were as set out below:

| | Treatment Conditions in Manton Gaulin homogeniser | | | | | | | | |
|---|---|---|---|---|---|---|---|---|---|
| | Aqueous suspension of refined bentonite | | | Suspension of quaternary ammonium compound | | | Suspension of organo-clay | | |
| Organo-clay | Pressure (psi) | No. of passes | KJ.Kg$^{-1}$ | Pressure (psi) | No. of passes | KJ.Kg$^{-1}$ | Pressure (psi) | No. of passes | KJ.Kg$^{-1}$ |
| F | 0 | 0 | 0 | 4000 | 1 | 876 | 4000 | 2 | 1536 |
| G | 4000 | 1 | 689 | 4000 | 1 | 876 | 4000 | 2 | 1536 |
| H | 0 | 0 | 0 | 2000 | 1 | 438 | 2000 | 2 | 768 |
| I | 0 | 0 | 0 | 4000 | 1 | 876 | 4000 | 1 | 768 |

In each case the clay suspension was added to the suspension of quaternary ammonium compound in proportions such that there were present in the organo-clay 116 milliequivalents of the quaternary ammonium cation per 100 g. of dry clay. The completed organo-clays were subjected to the tests for ease of dispersion and viscosifying effect as described in Example I and the results obtained are set forth in Table III below:

TABLE III

| Organo clay | Dispersion time (minutes) | Viscosity after 24 hours | | |
|---|---|---|---|---|
| | | 50 rpm | 5 rpm | 1 rpm |
| F | 8 | 1262 | 2008 | 2480 |
| G | 10 | 1372 | 2280 | 3000 |
| H | 10 | 1296 | 2080 | 2480 |
| I | 8 | 1258 | 2080 | 2600 |

These results show that it is not necessary to subject the aqueous suspension of refined bentonite to high shear mixing before addition to the suspension of quaternary ammonium compound and that the pressure in, and/or number of passes through, the Manton-Gaulin homogeniser may be reduced, provided that the amount of energy dissipated in the suspension is not less than 100 KJ Kg$^{-1}$.

EXAMPLE 4

Six further organo-clays, J to O, all in accordance with the invention, were prepared in accordance with the method described for organo-clay A in Example 1, except that in each case the suspension of clay was added to the dispersion of quaternary ammonium compound in different proportions such that a different value was obtained for the number of milliequivalents of the quaternary ammonium cation per 100 g. of dry clay. The completed organo-clays were subjected to the tests described in Example 1 and the results obtained are set forth in Table IV below:

TABLE IV

| Organo-clay | Milli-equivalents of cation per 100 g. of clay | Dispersion time (minutes) | Viscosity after 24 Hours (centipoise) | | |
|---|---|---|---|---|---|
| | | | 50 rpm | 5 rpm | 1 rpm |
| J | 95 | 30 | 1110 | 1488 | 1480 |
| K | 109 | 5 | 1090 | 1608 | 1800 |
| L | 117.5 | 11 | 1182 | 1968 | 2480 |
| M | 121 | 11 | 1206 | 1920 | 2400 |
| N | 130 | 20 | 1224 | 2120 | 2880 |
| O | 138 | 20 | 1232 | 2104 | 2880 |

The viscosity of an identical alkyd gloss paint composition, except that it contained no organo-clay was also measured and the results obtained were: at 50 rpm 810 centipoise; at 5 rpm 840 centipoise and at 1 rpm 760 centipoise.

These results show that the ease of dispersion is greatest when the number of milliequivalents of the quaternary ammonium cation present per 100 g. of dry clay is in the region of 100-115, but that for high viscosities, 120 milliequivalents or more of the quaternary ammonium cation are required per 100 g. of dry clay.

EXAMPLE 5

A further organo-clay, P, in accordance with the invention, was prepared by the method described for organo-clay A in Example 1, except that the quaternary ammonium compound used was dimethyl di-hydrogenated tallow ammonium chloride and the suspension of clay was added to the suspension of the quaternary ammonium compound in such proportions that there were present 147 milliequivalents of the quaternary ammonium cation per 100 g. of dry clay. The completed organo-clay was subjected to the tests described in Example 1 and the results obtained are set forth in Table V below:

TABLE V

| Organo-clay | Dispersion time (minutes) | Viscosity after 24 hours (centipoise) | | |
|---|---|---|---|---|
| | | 50 rpm | 5 rpm | 1 rpm |
| A | 7 | 1264 | 1960 | 3000 |
| P | 15 | 896 | 1728 | 3080 |

Organo-clay P was found to be slightly less easily dispersible than organo-clay A but provided a very good viscosifying effect at low shear.

EXAMPLE 6

A sample of the same raw Wyoming sodium bentonite as that used in Example 1 was mixed in a blunger with sufficient water to form a suspension containing 10% by weight of dry clay. The suspension thus formed was poured through a No. 300 mesh British Standard sieve and the undersize fraction was diluted to about 7-8% by weight of solids with water and subjected to a particle size separation in a nozzle discharge, disc centrifuge at a flow rate of 2 liters per minute. The suspension recovered as the fine fraction, containing 3.6% by weight of solid bentonite which consisted predominantly of particles having an equivalent spherical diameter smaller than 1 micron, was then passed twice through the Manton Gaulin homogeniser at a pressure of 4000 psi (27.6 MPa). The amount of energy dissipated in the suspension during this treatment was 1554 $KJ.Kg^{-1}$.

Organo-clays were prepared from the refined bentonite by two different procedures "X" and "Y" as described below:

PROCEDURE X (comparative)

A portion of the bentonite suspension was heated to 65° C. and stirred in a paddle mixer and there was added thereto a given quantity of benzyl methyl di-hydrogenated tallow ammonium chloride in isopropyl alcohol at 65° C. The mixture was stirred for a further 30 minutes after all the quaternary ammonium compound had been added and the suspension was then filtered. The filter cake was dried in an oven at 60° C. for 16 hours and the dry cake was milled in a laboratory screen pulveriser mill for a first pass with a screen of nominal aperture 0.12 mm and a second pass with a screen of nominal aperture 0.08 mm.

PROCEDURE Y (in accordance with invention)

A given quantity of benzyl methyl di-hydrogented tallow ammonium chloride in isopropyl alcohol at 65° C. was added to 1000 ml of water at 65° C. and the mixture was passed twice through the Manton Gaulin homogeniser at a pressure of 4000 psi (27.6 MPa). 500 g. of the refined bentonite suspension were then added and the resultant mixture was passed two further times through the manton Gaulin homogeniser at 4000 psi (27.6 MPa). The resultant suspension was then filtered and the organo-clay dried and milled as described for Procedure X above.

Four organo-clays containing different quantities of the quaternary ammonium compound were prepared by Procedure X and four by Procedure Y, the quantities of the quaternary ammonium compound being such that, for each organo-clay prepared by Procedure X there was a corresponding organo-clay prepared by Procedure Y which contained the same quantity of quaternary ammonium compound per unit weight of dry bentonite.

Each of the eight samples of milled organo-clay, identified respectively as organo-clays, Q1X, Q1Y, Q2X, Q2Y, Q3X, Q3Y, Q4X and Q4Y, were then incorporated into an alkyd gloss paint composition having the formulation given in Example 1. Each organo-clay was stirred into the paint composition, which was complete apart from the organo-clay, using the Cowles blade described in Example 1 for 15 minutes at 2500 rpm. At the end of this time a small sample was taken on a spatula and spread on a Hegman gauge. The Hegman gauge gave a measure of the degree of dispersion of the organo-clay in the paint composition by showing the size of the largest solid particles which were present in a significant proportion. In the case in which the majority of the particles were too small to be seen on the Hegman gauge the size of the particles was quoted as "0 μm" and a figure was recorded for the number of "specks" or of the few remaining visible particles.

A large sample of each completely mixed paint composition was allowed to stand for 24 hours and the viscosity of the composition at 21° C. was measured using a Brookfield Viscometer at 1 rpm using Spindle No. 2.

The results obtained are set forth in Table VI below. Also given in Table VI is the energy in kilojoules per kilogram of dry solids dissipated in the suspension of the quaternary compound and in the mixture of the quaternary ammonium compound and refined bentonite for each of the organo-clays Q1Y, Q2Y, Q3Y and Q4Y.

TABLE VI

| Organo-clay | meq. of Cation per 100 g of clay | Energy dissipated ($KJ.Kg^{-1}$) in quat. amm. cmpd | Energy dissipated ($KJ.Kg^{-1}$) in quat. amm. cmpd + clay | Hegman gauge readings largest particles (μm) | no. of specks | Viscosity after 24 hours 1 rpm (cP) |
|---|---|---|---|---|---|---|
| Q1X | 94.5 | | | 70 | | 2240 |
| Q1Y | 94.5 | 5037 | 2883 | 0 | 20 | 2520 |
| Q2X | 105.7 | | | 70 | | 2800 |
| Q2Y | 105.7 | 4503 | 2758 | 0 | 5 | 3360 |
| Q3X | 115.3 | | | 80 | | 3190 |
| Q3Y | 115.3 | 4129 | 2659 | 0 | 5 | 3800 |
| Q4X | 126.5 | | | 75 | | 3720 |
| Q4Y | 126.5 | 3762 | 2553 | 0 | 4 | 3920 |

An identical alkyl gloss paint composition, but containing no organo-clay, was subjected to the same tests as were described above. After 15 minutes mixing a sample spread on the Hegman gauge gave a reading of 0 μm for the size of the largest particles present and 2 for the number of specks. The viscosity at 1 rpm after standing for 24 hours was 1040 centipoise.

These results show that the organo-clays prepared by Procedure Y dispersed more readily in the organic medium and also showed superior gelling properties as compared with the organo-clays prepared by Procedure X.

EXAMPLE 7

A series of organo-clays, R1–R7, was prepared using the procedure described in Example 6 and Procedure Y above except that the suspension of refined bentonite was passed once only through the Manton Gaulin homogeniser at a pressure of 4000 psi (27.6 MPa), the amount of energy dissipated in the suspension being 777 $KJ.Kg^{-1}$. For each of the organo-clays in the series a different pressure was used in the Manton Gaulin homogeniser for the treatment of the suspension of the quaternary ammonium compound and for the treatment of the suspension of the mixture of the quaternary ammonium compound and bentonite, the pressures used in the two steps of the process being the same for each organo-clay. The amount of the quaternary ammonium compound corresponded to 115 milliequivalents of benzyl methyl di-hydrogenated tallow ammonium chloride per 100 g. of dry bentonite.

A second series of organo-clays, S1–S8, was prepared as described above except that the quaternary ammonium compound was dimethyl di-hydrogenated tallow and the amount used corresponded to 125 milliequivalents per 100 g. of dry bentonite.

Each of the milled organo-clays was then stirred into an alkyd gloss paint composition having the formulation given in Example 1, using the Cowles blade for 15 minutes at 2500 rpm. At the end of this time a small sample was taken on a spatula and spread on a Hegman gauge. A figure was recorded for each organo-clay either for the size of the largest particles present in a significant proportion or for the number of "specks".

The results obtained are set forth in Table Table VII below.

TABLE VII

| Organo-clay | Pressure in homogeniser (MPa) | Energy-dissipated $(KJ.Kg^{-1})$ in quat. amm. cmpd. | Energy-dissipated $(KJ.Kg^{-1})$ in quat. amm. cmpd + clay | Hegman gauge readings largest particles (μm) | No. of specks |
|---|---|---|---|---|---|
| R1 | 0 | 0 | 0 | 0 | 25 |
| R2 | 3.4 | 517 | 333 | 0 | 37 |
| R3 | 6.9 | 1034 | 666 | 0 | 7 |
| R4 | 10.3 | 1552 | 998 | 0 | 7 |
| R5 | 13.8 | 2069 | 1331 | 0 | 5 |
| R6 | 27.6 | 4138 | 2662 | 0 | 5 |
| R7 | 41.4 | 6206 | 3994 | 0 | 5 |
| S1 | 0 | 0 | 0 | 75 | |
| S2 | 3.4 | 539 | 339 | 70 | |
| S3 | 6.9 | 1077 | 677 | 65 | |
| S4 | 10.3 | 1616 | 1016 | 60 | |
| S5 | 13.8 | 2155 | 1354 | 55 | |
| S6 | 24.1 | 3771 | 2370 | 0 | 35 |
| S7 | 27.6 | 4310 | 2708 | 0 | 5 |
| S8 | 41.4 | 6464 | 4062 | 0 | 5 |

These results show that when the quaternary ammonium compound is benzyl methyl di-hydrogenated tallow (R1–R7) the organo-clay disperses fully within 15 minutes when about 100 KJ of energy per kilogram of dry organo-clay have been dissipated in the suspension of the organo-clay, whereas when the quaternary ammonium compound is dimethyl di-hydrogenated tallow (S1–S8) about 2500 KJ of energy per kilogram of dry organo-clay are required to achieve the same effect.

EXAMPLE 8

Organoclay samples were prepared by the following method:

In each case an aqueous suspension of bentonite was prepared by mixing raw Wyoming sodium bentonite in a blunger with sufficient water to form a suspension containing 10% by weight of dry clay. The suspension thus formed was passed through a No. 300 mesh British Standard sieve (nominal aperture 0.053 mm) and the undersize fraction was diluted to about 6% by weight of solids with water and subjected to a particle size separation in a nozzle discharge, disc centrifuge at a flow rate of 1 liter per minute. The fine fraction was then passed once through a Manton Gaulin homogeniser at a pressure of 4000 psi (27.6 MPa).

A quaternary ammonium compound, which was either dimethyl di(hydrogenated tallow) ammonium chloride (2M2HT) or methyl benzyl di(hydrogenated tallow) ammonium chloride (MB2HT), was mixed with the aqueous suspension of bentonite by one of the following two methods A and B:

METHOD A

The calculated weight of quaternary ammonium compound required to provide a given loading of quaternay ammonium compound on the bentonite having regard to the percentage by weight of dry bentonite in the aqueous suspension, the molecular weight of the quaternary ammonium compound and its concentration in the mixture with isopropyl alcohol in which form it is available in commerce, was melted and poured into 1 liter of water at 65° C., and the resultant mixture was subjected to agitation by means of a Silverson shrouded impeller mixer for 5 minutes.

The resultant emulsion was allowed to cool overnight and there was then added to the emulsion 1 kg. of the suspension of bentonite clay prepared as described above at a temperature of either 20° C. or 65° C.

METHOD B

The calculated weight of quaternary ammonium compound was melted and poured into 150 g of cold isopropyl alcohol and the resultant solution allowed to cool. There was then added to the solution 1 kg. of the suspension of bentonite clay prepared as described above at a temperature of either 20° C. or 65° C.

Organoclays prepared by both method A and method B were subjected to mechanical work by being passed once through a Manton Gaulin homogeniser at a pressure of 4000 psi (27.6 MPa) when the quaternary ammonium compound was MB2HT and twice through the Manton Gaulin homogeniser at the same pressure of 4000 psi (27.6 MPa) when the quaternary ammonium compound was 2M2HT. In each case the suspension of the organoclay was then filtered on a Buchner funnel, washed with hot water and dried for 16 hours at 60° C. in an air-swept oven. The dry product was then milled to pass through a sieve of nominal aperture 0.080 mm.

Further organo-clay samples were prepared by Methods C and D which were identical to Methods A and B respectively, except that the final mixture was not subjected to mechanical work in a Manton Gaulin homogeniser, but instead was gently mixed by means of a paddle mixer for 30 minutes.

Each organoclay sample was incorporated into a paint composition prepared according to the following The results obtained are set forth in Table VIII below:

TABLE VIII

| Method | Quaternary Ammonium Compound | Milli-Equivalents of Cation per 100 g of Clay | Energy Dissipated in Quaternary Ammonium Compound + Clay (kJ.kg$^{-1}$) | Mixing Temp. (°C.) | Hegman Gauge Reading Largest Particles (μm) | Viscosity after 24 hours (mPa.s) at | | |
|---|---|---|---|---|---|---|---|---|
| | | | | | | 1 rpm | 5 rpm | 50 rpm |
| A inv. | 2M2HT | 118 | 1643 | 20 | 75 | 3640 | 2400 | 1360 |
| A inv. | 2M2HT | 120 | 1619 | 65 | 6 | 2800 | 1960 | 1180 |
| A inv. | MB2HT | 120 | 769 | 20 | 22 | 3720 | 2440 | 1360 |
| A inv. | MB2HT | 116 | 780 | 65 | 6 | 3120 | 2320 | 1430 |
| B inv. | 2M2HT | 118 | 1643 | 20 | 6 | 2800 | 2040 | 1270 |
| B inv. | MB2HT | 117 | 778 | 20 | 6 | 3400 | 2240 | 1300 |
| C comp. | 2M2HT | 115 | 0 | 65 | 75 | 2200 | 1360 | 808 |
| C comp. | MB2HT | 113 | 0 | 20 | 37 | — | — | — |
| D comp. | 2M2HT | 119 | 0 | 20 | 87 | 2480 | 2040 | 1380 |
| D comp. | 2M2HT | 122 | 0 | 65 | 75 | 1800 | 1440 | 980 |
| D comp. | MB2HT | 119 | 0 | 20 | 87 | 3250 | 2520 | 1500 |
| D comp. | MB2HT | 120 | 0 | 65 | 75 | 2800 | 1920 | 1160 |
| Paint composition without organoclay | | | | | 6 | 880 | 896 | 740 | formulation. The following ingredients were first mixed together in the given proportions by weight:

| Paint Composition | |
|---|---|
| Ingredient | Wt. % |
| Alkyd resin | 20.0 |
| White Spirit | 8.25 |
| Calcium naphthenate | 0.9 |
| Titanium dioxide | 29.8 |
| Methylated ketoxime | 0.2 |

When the above components of the composition had been thoroughly mixed, the following materials were added under stirring in the following order:

| Ingredient | Wt. % |
|---|---|
| Alkyd resin | 33.0 |
| White Spirit | 6.25 |
| Lead naphthenate | 0.8 |
| Cobalt naphthenate | 0.3 |
| Organoclay | 0.5 |
| Total: | 100.0% |

The calcium, lead and cobalt naphthenate are drying agents and the methylethyl ketoxime is an anti-skin agent.

Each organoclay was stirred into the paint composition having the above formulation using a Cowles blade of diameter 41 mm at a speed of 2500 rpm for 15 minutes. At the end of this time a small sample of the paint was taken on a spatula and spread on a Hegman gauge. The Hegman gauge gave a measure of the degree of dispersion of th organoclay in the paint composition by showing the size of the largest solid particles which were present in a significant proportion.

A large sample of each completely mixed paint composition, incorporating the organoclay, was allowed to stand for 24 hours and the viscosity of the composition at 21° C. was measured using a Brookfield Viscometer fitted with spindle No. 2 at speeds of 1 rpm, 5 rpm and 50 rpm respectively.

As a control the paint composition without the organoclay was also tested for size of the largest solid particles and for viscosity at 21° C. at speeds of 1 rpm, 5 rpm and 50 rpm.

These results show that method A, wherein the suspension of clay is mixed with an aqueous emulsion of the quaternary ammonium compound provides a good organoclay with both MB2HT and 2M2HT when the mixing of the clay with the quaternary ammonium compound is performed at 65° C. At a mixing temperature of 20° C. the organoclay formed with 2M2HT does not disperse sufficiently readily in a paint composition, but the organoclay formed with MB2HT shows an ease of dispersibility which may be acceptable under certain conditions. In each case it is necessary to subject the mixture of clay and quaternary ammonium compound to high shear mixing in the Manton Gaulin homogeniser and that Method B, wherein the suspension of clay is mixed with a solution of the quaternary ammonium compound in isopropyl alcohol, provides a readily dispersible organoclay with both MB2HT and 2M2HT at a mixing temperature of 20° C. However, in the absence of high shear mixing in a Manton Gaulin homogeniser (Method D), a readily dispersible organoclay was not formed with either quaternary ammonium compound at either 65° C. or 20° C.

EXAMPLE 9

1 kg. samples of an aqueous suspension of bentonite clay were prepared from the same Wyoming sodium bentonite and using the same process as described in Example 8.

An organoclay was then prepared from each sample of bentonite suspension using the method described below:

METHOD E

The calculated weight of quaternary ammonium compound required to provide a given loading of quaternary ammonium compound on the bentonite, having regard to the percentage by weight of dry bentonite in the aqueous suspension, the molecular weight of the quaternary ammonium compound and its concentration in the mixture with isopropyl alcohol in which form it is available in commerce, was melted and poured into 1 kg. of the aqueous suspension of bentonite at 65° C. The resultant mixture was then passed once through the Manton Gaulin homogeniser at a pressure of 4000 psi (27.6 MPa) when the quaternary ammonium compound was MB2HT and twice through the Manton Gaulin homogeniser at the same pressure of 4000 psi (27.6

MPa) when the quaternary ammonium compound was 2M2HT. The suspension of the organoclay was then filtered on a Buchner funnel, washed with hot water and dried for 16 hours at 60° C. in an air-swept oven. The dry product was then milled to pass through a sieve of nominal aperture 0.080 mm.

Each organoclay sample was incorporated into an alkyd gloss paint formulation exactly as described in Example 8. After 15 minutes stirring with the bowles blade, each paint sample was tested for the size of the largest solid particles present in a significant proportion. Larger samples were then tested for viscosity as described in Example 8.

The results obtained are set forth in Table IX below:

TABLE IX

| Method | Quaternary Ammonium Compound | Milli-Equivalents of Cation per 100g of Clay | Energy Dissipated in Quaternary Ammonium Compound + Clay (kJ.kg$^{-1}$) | Hegman Gauge Reading Largest Particles ($\mu$m) | Viscosity after 24 hours (mPa. s) at | | |
|---|---|---|---|---|---|---|---|
| | | | | | 1 rpm | 5 rpm | 50 rpm |
| E | 2M2HT | 125 | 796 | 9 | 2480 | 1928 | 1360 |
| E | MB2HT | 122 | 764 | 9 | 3440 | 2384 | 1524 |
| Paint composition without organoclay | | | | 9 | 920 | 1080 | 970 |

These results show that it is not necessary to dilute the quaternary ammonium compound with water before mixing with the bentonite suspension. Organoclays showing good dispersibility and viscosifying properties in paint can be formed by mixing molten quaternary ammonium compound with the bentonite suspension.

What is claimed is:

1. A process for preparing an organo-clay which is readily dispersible in an organic medium, which process comprises
   (a) mixing an aqueous suspension of a smectite clay with a quaternary ammounium compound capable of rendering the smectite clay organophilic;
   (b) subjecting the mixture formed in step (a) to high shear mixing for a time sufficient to dissipate in the mixture at least 100 KJ of energy per kg. of dry solids in the mixture; and
   (c) dewatering the product of step (b).

2. A process according to claim 1, wherein the dewatered product of step (c) is dried and milled.

3. A process according to claim 1, wherein before the aqueous suspension of the smectite clay is mixed with the quaternary ammonium compound, the latter is melted and then mixed with hot water at a temperature higher than the melting point of the quaternary ammonium compound.

4. A process according to claim 3, wherein the mixture of the molten quaternary ammonium compound and hot water is subjected to high shear mixing for a time sufficient to dissipate in the mixture at least 100 KJ of energy per kg. of dry quaternary ammonium compound, before it is mixed with the aqueous suspension of the smectite clay.

5. A process according to claim 1, wherein the quaternary ammonium compound can be represented by the general formula:

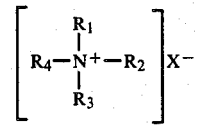

wherein $R_1$ is selected from saturated and unsaturated alkyl groups having from 10 to 24 carbon atoms, $R_2$ and $R_3$, which may be the same or different, are each selected from saturated and unsaturated alkyl groups having from 1 to 24 carbon atoms and aralkyl groups having from 7 to 10 carbon atoms, $R_4$ is selected from alkyl groups having from 1 to 6 carbon atoms and aralkyl groups having from 7 to 10 carbon atoms, and X is selected from OH, Cl, Br, I, $NO_2$, $CH_3SO_4$ and $CH_3.COO$.

6. A process according to claim 5, wherein the quaternary ammonium compound is selected from the group consisting of benzyl methyl dialkyl ammonium chlorides, dimethyl dialkyl ammonium chlorides, benzyl dimethyl alkyl ammonium chlorides, benzyl trialkyl ammonium chlorides and methyl trialkyl ammonium chlorides in which the one or more alkyl group represents a mixture of hydrocarbon radicals derived from tallow having from 14 to 20 carbon atoms.

7. A process according to claim 1, wherein the aqueous suspension of the smectite clay is added to the quaternary ammonium compound and not vice versa.

8. A process according to claim 1, wherein the smectite clay is mixed with the quaternary ammonium compound in proportions such that there are present from 95 to 140 milliequivalents of quaternary ammonium cation per 100 g of dry clay.

* * * * *